C. W. SMITH.
COMBINED WATER WHEEL AND DAM.
APPLICATION FILED SEPT. 16, 1918.
1,373,456.
Patented Apr. 5, 1921.
3 SHEETS—SHEET 1
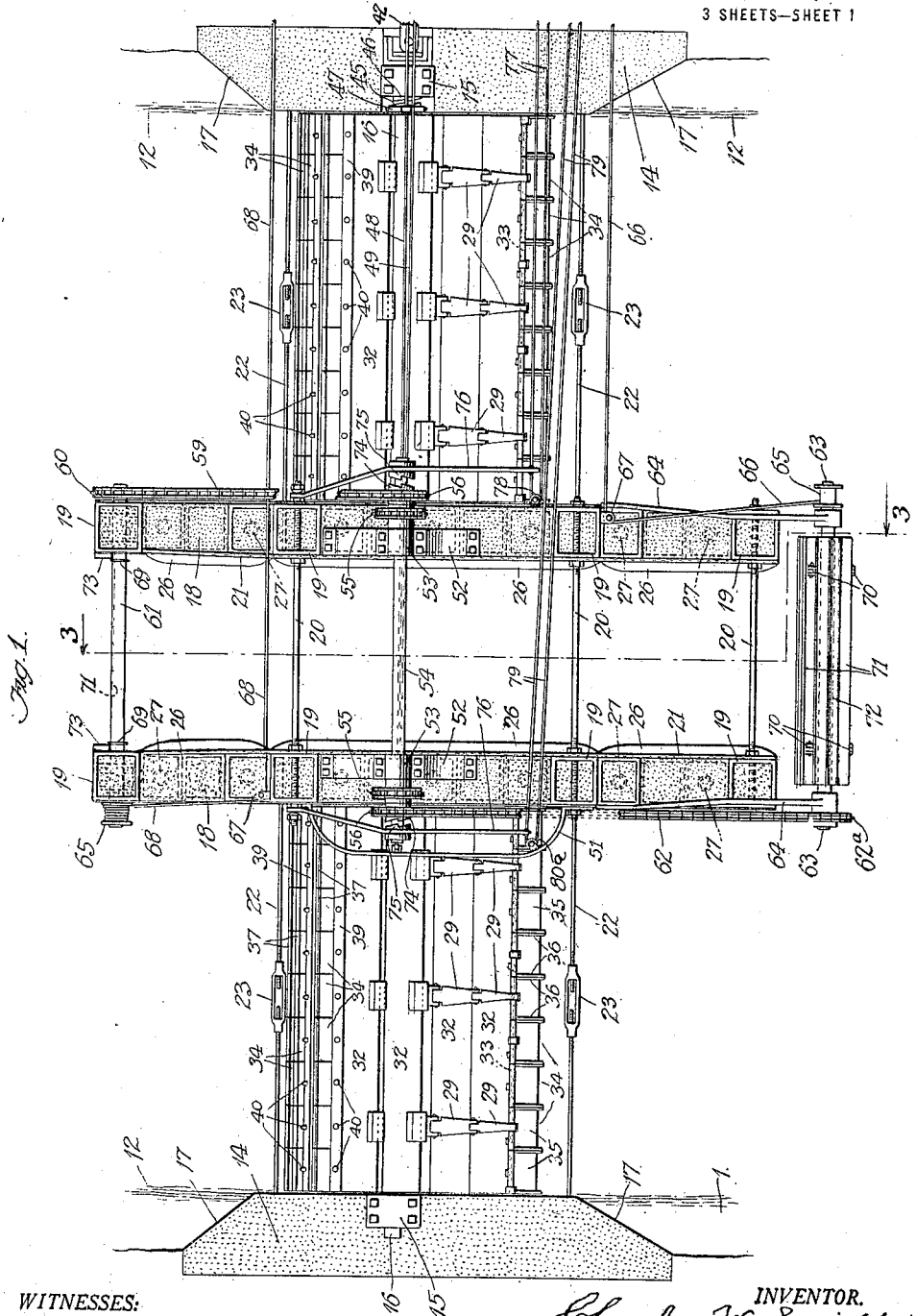

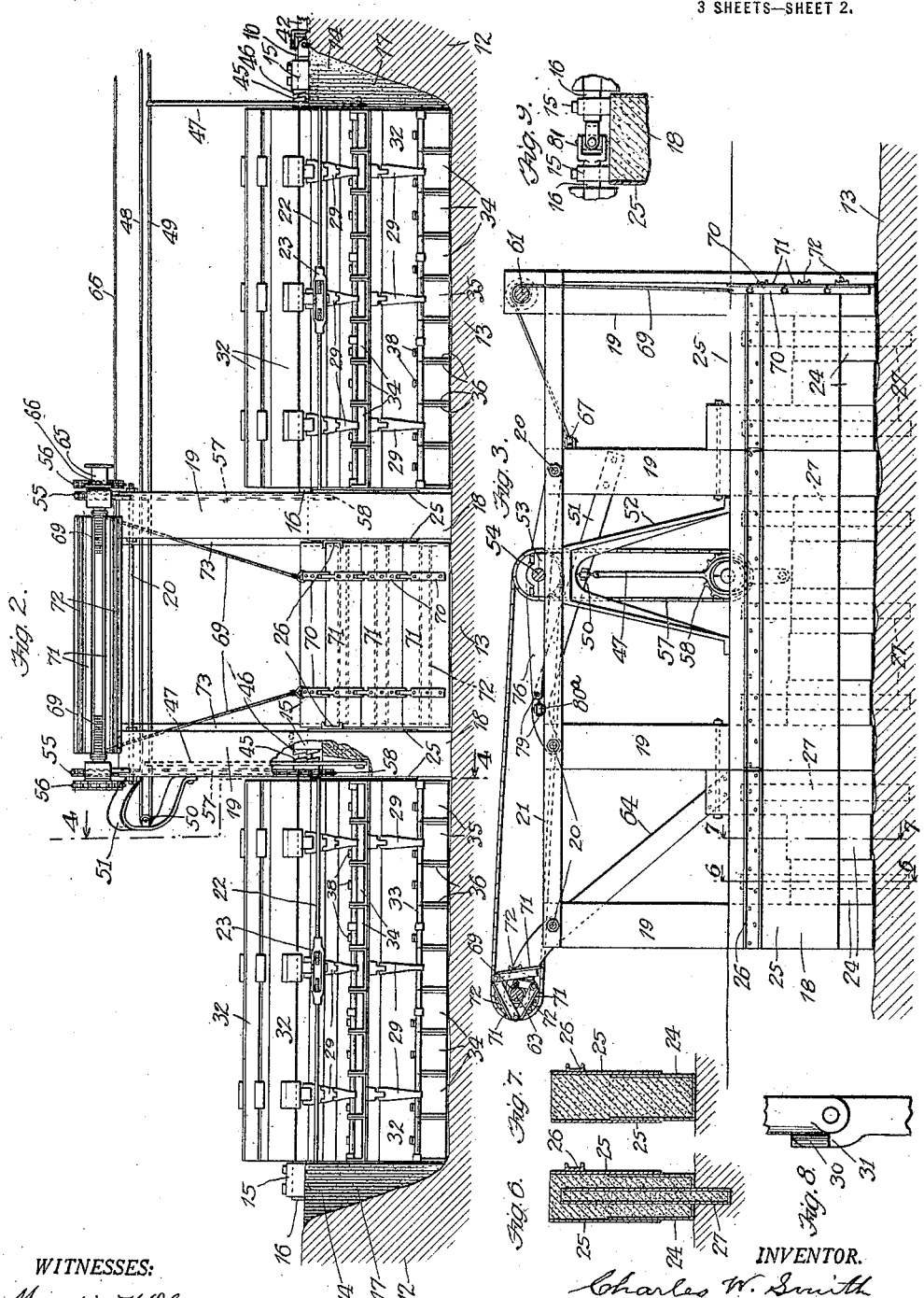

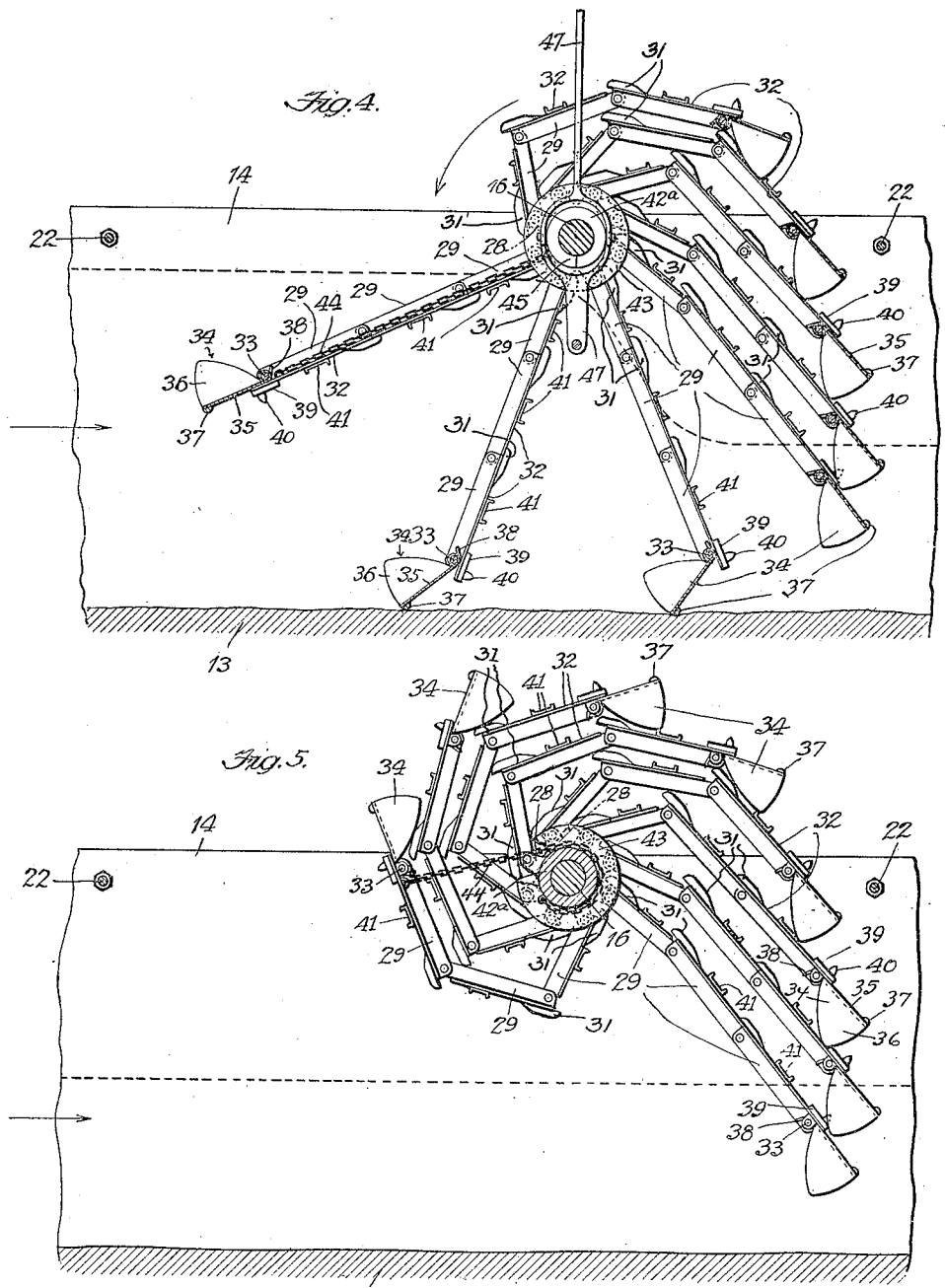

UNITED STATES PATENT OFFICE.

CHARLES W. SMITH, OF CHICAGO, ILLINOIS.

COMBINED WATER-WHEEL AND DAM.

1,373,456. Specification of Letters Patent. Patented Apr. 5, 1921.

Application filed September 16, 1918. Serial No. 254,270.

*To all whom it may concern:*

Be it known that I, CHARLES W. SMITH, a citizen of the United States, and a resident of Chicago, county of Cook, and State of Illinois, have invented certain new and useful Improvements in Combined Water-Wheels and Dams, of which the following is a specification.

The invention relates to water wheels and seeks to provide an improved construction by which the current of a river or other stream of water can be readily utilized for the generation of power and in which the water wheel forms a dam for increasing the level or head of water above the wheel. The invention also seeks to provide a lock construction in connection with the water wheel. The invention consists in the features of improvement hereinafter set forth, illustrated in the preferred form in the accompanying drawings, and more particularly pointed out in the appended claims.

In the drawings—

Figure 1 is a plan view of the improved construction;

Fig. 2 is an elevation, with the bed and banks of the stream or river shown in section;

Fig. 3 is a longitudinal section on the line 3—3 of Fig. 1;

Fig. 4 is a cross-section on the line 4—4 of Fig. 2, the parts being shown on an enlarged scale;

Fig. 5 is a similar view with the buckets of the water wheel shown in inoperative position; and Figs. 6, 7, 8 and 9 are detail views.

The improved water wheel is shown applied to a river or stream of water having banks 12 and a bed or bottom 13 at opposite points. The river banks are provided with abutments or supports 14 of concrete, or like material, which extend lengthwise of the stream and upwardly to a point considerably above the level of the stream. These abutments form supports for the outer ends of one or more water wheels or units and for this purpose are provided with journal boxes 15 within which the outer ends of the water wheel shafts 16 are journaled. The abutments or outer supports 14 are provided with parallel vertical outer faces extending lengthwise of the stream and, preferably as shown, the end faces of the abutments are inclined.

If the improved wheel is provided with but a single unit it may extend between the vertical faces of the opposite abutments 14, but preferably as shown, two inner abutments, walls or supports 18, are provided upon the river bed or bottom, which extend lengthwise of the stream and are spaced from each other and from the abutments 14. The inner walls or supports 18 are each provided with a series of upright hollow posts 19 which extend upwardly to a considerable height and are connected at their upper ends by transverse tie rods 20 and longitudinally extending bars 21. The posts 19 are preferably hollow, rest at their lower ends upon the river bed and have their lower portions filled with cement. Two of the posts 19 of each support or abutment 18 are connected to the adjacent abutment 14 by tie rods 22 that are preferably provided with turn buckles 23. A series of box-like members 24 having closed lower ends resting upon the river bed are arranged in contact with each other and with the lower portions of the posts 19. Side plates 25 are fixed to the member 24 and are reinforced by channel bars 26. Anchoring posts 27 extend through some of the members 24 and into the river bottom, as shown in Fig. 6, and the members 24 and the spaces between the plates 25 are filled with cement, as shown. The inner abutments or supports 18 are preferably of considerably greater length than the outer abutments 14 to form a lock or passageway for boats and a water wheel or power unit is mounted between each pair of inner and outer abutments. For this purpose abutments 18, like the abutments 14, are provided with journal boxes 15 for the inner ends of the two shafts 16 of the water wheels.

The water wheels are of similar construction and each shaft has a series of blades or paddles which extend between the abutments 14 and 18. In the form shown each blade or paddle comprises a member 28 mounted in radial position on the shaft and a number of rows of links 29 pivoted to the members 28, the links of each row being pivotally connected together at their adjacent ends. The pivotal connections between the links 29 and between the links and the members 28 are in the form of rule joints, having abutments or stops 30 and 31 which are adapted to abut when the links are radially in line and permit the flexing of the links in one direction only from radial position. The links of each blade or paddle on the wheel are connected by plates 32, the edges of which abut when the links are in radial position. The outer links of each blade or paddle are provided at their ends with a transverse rod 33 on which are pivotally mounted a series of drags 34 which are adapted to contact with the river bed during the rotation of the water wheel. Each drag comprises a plate or floor 35 having end flanges 36 disposed at right-angles thereto and the outer free edge of each drag is preferably provided with a reinforcing strip 37. The drags of each paddle are arranged closely adjacent with the flanges 34 thereof in contact.

The arrows in Fig. 4 indicate the direction of flow of the river or stream of water and the direction of rotation of the water wheel. The pressure and weight of water upon the paddles therein will obviously hold the sections of each submerged blade in its radial or extended position with the sections thereof in contact and with the pivoted drags thereof in contact with the bottom of the river bed as the blades approach and recede from their lowermost position. The blades are so closely adjacent each other that the drags of one of them is always in contact with the river bed and will not be disengaged therefrom until the drags of the next blade engage the river bottom. Because of this arrangement and since the blades or sections of each weight or paddle are in substantial contact at their ends with the faces of the abutments, each blade or paddle as it approaches and recedes from its lowermost position fills the space above the river bed and between the spaced abutments. Hence, the water wheel itself acts as a dam and the resistance of its load increases the head or height of water above or on the upstream side of the wheel as shown by the dotted line indication of the water level in Fig. 4. The parts are so arranged that the water wheel shaft is above the high water level on the upstream side of the wheel. As the blades pass up and out of the water they are flexed substantially as shown in the upper right-hand portion of Fig. 4. Stops 38 fixed to the drags 34 and abutments or strips 39 fixed to the outer edges of the blades or paddles limit the swinging movement of the drags. Preferably as shown, each strip 39 is provided with spaced projections 40 which are arranged to engage and break up pieces of floating ice and also engage and carry along logs or the like as they float downstream. Preferably also the plates or sections 32 of the paddles or blades are strengthened by channel bars 41.

The shafts of the two wheels or units are connected together as hereinafter described and the power developed thereby is transferred to operate machinery as desired through a transmission shaft 42.

Means are provided for shifting the blades of each wheel into inoperative position. For this purpose each shaft is provided with a loose collar 42$^a$ having flanges 43 and a chain connects the collar with the free end of one of the blades or paddles. Coöperating clutch members 45 and 46 are respectively formed upon the collar and the adjacent face of one of the journal boxes 15 and these normally disengaged clutch members are adapted to be engaged by a shift lever 47 to thereby hold the collar 42$^a$ against rotation. The continued movement of the blades and shaft 16 will, as the chain winds up upon the collar, shift the blades to the inoperative position shown in Fig. 5. The wheel may again be placed in operation by releasing the clutch members. The clutch levers 47 of each wheel or unit are operated by a pair of connected cables 48 and 49 which extend from one of the river banks over a guide pulley 50 mounted on a bracket 51.

Two forked supports 52 are centrally mounted upon the inner supports or abutments 18 and carry journal boxes 53 in which a transverse shaft 54 is journaled. This shaft is provided at each end with two sprocket wheels 55 and 56 and the sprocket wheels 55, which are fixed to the shaft, are connected by chains 57 to sprocket wheels 58 upon the inner adjacent ends of the shafts 16 so that a connection is formed between the two water wheels or power units. One of the sprocket wheels 56 which is loose on the shaft is connected by a chain 59 to a sprocket wheel 60 on a transverse shaft 61 which is journaled in the upper ends of two of the end posts 19. The other sprocket 56 which is also loose on the shaft is connected by a chain 62 to a sprocket wheel 62$^a$ on a shaft 63 which is journaled in the upper ends of a pair of upwardly inclined bars 64 which are mounted upon the adjacent posts 19 at the opposite ends of the abutments 18. Each of these shafts 61 and 63 is provided with a spool or drum 65 and cables 66 and 68 are wound on these spools. These cables pass over guide pulleys 67 to the bank of the river or stream. A pair of cables 69 wound on each of these shafts is connected to two series of links 70 carrying plates or sections 71 which are provided with strengthening channel bars 72 and form gates for the ends of the space or lock between the pair of inner piers or abutments 18. The gate at the upstream ends of the abutments 18 is arranged to bear against the faces of the upper end posts 19, while the gate at the downstream ends engage strips 73 (see Fig. 1) fixed to the lower end posts 19.

The sprockets 56 are adapted to be connected to the shaft 54 to rotate the shafts 61 and 63 and raise the gates by clutch members 74 fixed to the sprocket wheels and companion clutch members 75 keyed to the shaft 54. The clutch members 75 are shifted into and out of engagement by levers 76, one of which is connected to a cable 77 passing over a guide pulley 78 and the other of which is connected to a cable 79 passing over a guide pulley 80. The cables lead to one bank of the river and can be manipulated to engage either pair of clutch members and raise either of the gates. When the gates are in lowered position the cables 66 and 68 will be wound upon the spool 65 so that as the gates are raised these cables are unwound and can be manipulated from the shore to hold the gates raised or lower them as desired. When the wheel is in operation at least one of the gates is lowered to maintain the head of water above the wheel and by manipulating the gates boats can be passed through the lock without materially lowering the head of water. If desired, the head of water above the wheel can be reduced or regulated by opening the gates to a slight extent, or by regulating the resistance or load on the water wheel. If desired or necessary to completely span the river, additional water wheels or units can be provided by providing additional abutments 18 and connecting the shafts of adjacent units by universal joints 81, as indicated in Fig. 9.

Obviously changes may be made in the details set forth without departure from the essentials of the invention as defined in the claims.

I claim as my invention:

1. A combined water wheel and dam for rivers, streams and the like, comprising spaced abutments having opposed faces, a horizontal power shaft and a series of paddles mounted on said shaft each adapted to span the space between the faces of said abutments and said paddles having plates hinged to their outer ends and adapted to contact with the river bottom, whereby a head of water is maintained above the wheel, such as described.

2. A combined water wheel and dam for rivers, streams and the like, comprising spaced abutments having opposed faces, extending longitudinally of the river, a horizontal power shaft above the normal level of the river, and a series of paddles mounted on said shaft, each adapted to span the space between the faces of said abutments, and said paddles having drag plates hinged to their outer ends, adapted to contact with the river bed and so arranged that, in operation, the drag plates of at least one paddle are maintained in engagement with the river bed, such as described.

3. A combined water wheel and dam for rivers, streams and the like, comprising spaced abutments having opposed faces, extending longitudinally of the river, a horizontal power shaft above the normal level of the river, and a series of paddles mounted on said shaft, each adapted to span the space between the faces of said abutments, and each having a series of independent, pivoted drag plates at its outer end adapted to contact with the river bed, said paddles and drag plates being arranged to dam the river between said abutments and increase the head of water above the wheel, such as described.

4. A combined water wheel and dam for rivers, streams and the like, comprising spaced abutments having opposed faces, extending longitudinally of the river, a horizontal power shaft above the normal level of the river, and a series of paddles mounted on said shaft, each adapted to span the space between the faces of said abutments, and each having a series of independent, pivoted drag plates at its outer end having contacting flanges at their side edges, and so arranged that, in operation, the drag plates of at least one of the paddles are maintained in engagement with the river bed, such as described.

5. A combined water wheel and dam for rivers, streams and the like, comprising spaced abutments having opposed, vertical parallel faces extending longitudinally of the river, a horizontal power shaft mounted on said abutments above the normal level of the river, and a series of paddles mounted on said shaft, each adapted to span the space between said faces of said abutments and having a series of independent pivoted drag plates at its outer end arranged in contact and adapted to engage with the river bottom, said paddles and drags being arranged to dam the space between said abutments and increase the head of water above the wheel, such as described.

6. A combined water wheel, dam and lock for rivers, streams and the like, comprising a series of spaced abutments, having opposed faces extending longitudinally of the river and the end abutments of the series being located at the river banks, lock gates at the up and down stream ends of one of the spaces between said abutments, and one or more water wheel units arranged in the remaining spaces between said abutments and having paddles each adapted to span the space between the abutments and said paddles being provided with drag plates flexibly mounted at their outer ends and adapted to contact with the river bed, the lock gates, paddles and drag plates being arranged to dam the river and increase the head of water above the wheel unit or units, such as described.

7. A combined water wheel, dam and lock for rivers, streams and the like, comprising a series of spaced abutments, having opposed faces extending longitudinally of the river and the end abutments of the series being located at the river banks, lock gates at the up and down stream ends of one of the spaces between said abutments, one or more water wheel units arranged in the remaining spaces between said abutments and having paddles provided with pivoted drag plates adapted respectively to span the spaces between said abutments and contact with the river bed, and clutch controlled means for operating said lock gates from said water wheel unit or units, such as described.

8. A combined water wheel and dam for rivers, comprising spaced abutments, a horizontal power shaft above the normal level of the river, and a series of paddles mounted on said shaft and having flexibly mounted drag plates at their outer ends, said paddles and drag plates being arranged, in operation, to dam the space between said abutments and increase the head of water above the wheel, and means for regulating the head, such as described.

9. A combined water wheel and dam for rivers, comprising spaced abutments, a horizontal power shaft above the normal level of the river, and a series of paddles mounted on said shaft and having flexibly mounted drag plates at their outer ends, said paddles and drag plates being arranged, in operation, to dam the space between said abutments and increase the head of water above the wheel, and clutch controlled means for throwing said paddles into and out of operation, such as described.

CHARLES W. SMITH.

Witnesses:
CHAS. C. TILLMAN,
C. C. CASEY.